(12) United States Patent
Toohey et al.

(10) Patent No.: US 12,476,984 B2
(45) Date of Patent: Nov. 18, 2025

(54) QUANTUM-BASED INFORMATION PROTECTION

(71) Applicant: Wells Fargo Bank, N.A., San Francisco, CA (US)

(72) Inventors: Richard Orlando Toohey, San Francisco, CA (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 171 days.

(21) Appl. No.: 18/234,272

(22) Filed: Aug. 15, 2023

(65) Prior Publication Data

US 2025/0063055 A1 Feb. 20, 2025

(51) Int. Cl.
*H04L 9/40* (2022.01)

(52) U.S. Cl.
CPC .......... *H04L 63/1416* (2013.01); *H04L 63/08* (2013.01); *H04L 63/1475* (2013.01)

(58) Field of Classification Search
CPC . H04L 63/1416; H04L 63/08; H04L 63/1475; H04L 63/0876; H04L 2463/082
See application file for complete search history.

(56) References Cited

U.S. PATENT DOCUMENTS

| | | | | |
|---|---|---|---|---|
| 8,695,097 B1 * | 4/2014 | Mathes | ............... | H04L 63/1408 726/25 |
| 8,925,053 B1 * | 12/2014 | Mehta | .................... | G06F 21/31 726/4 |
| 9,680,642 B2 * | 6/2017 | Yeh | ......... | H04L 9/0855 |
| 9,838,384 B1 * | 12/2017 | Kane-Parry | ........... | G06F 21/316 |
| 10,223,084 B1 * | 3/2019 | Dunn | ........................ | G06F 8/41 |
| 10,355,857 B2 * | 7/2019 | Earl | ...................... | H04L 9/0825 |
| 10,523,686 B1 * | 12/2019 | Mehta | .................... | H04L 63/083 |
| 10,552,120 B1 * | 2/2020 | Vakili | .................... | H04L 9/0852 |
| 10,567,375 B1 * | 2/2020 | Mossler | ............... | H04L 63/101 |
| 10,623,446 B1 * | 4/2020 | Stoler | ................... | H04L 63/101 |
| 10,728,029 B1 * | 7/2020 | Vakili | .................... | H04L 9/0858 |
| 10,797,869 B1 * | 10/2020 | Vakili | .................... | H04L 9/0662 |
| 10,855,454 B1 * | 12/2020 | Vakili | ...................... | H04L 9/001 |
| 10,855,457 B1 * | 12/2020 | Vakili | .................. | H04L 9/0869 |
| 10,873,601 B1 * | 12/2020 | Stickle | ............ | H04L 63/1416 |
| 10,949,520 B2 * | 3/2021 | Duane | .................. | G06Q 20/401 |
| 11,025,416 B1 * | 6/2021 | Vakili | ................. | H04L 65/1079 |
| 11,190,349 B1 * | 11/2021 | Vakili | .................. | H04L 9/0869 |
| 11,218,471 B1 * | 1/2022 | Stapleton | .............. | H04L 9/0668 |
| 11,240,013 B1 * | 2/2022 | Vakili | .................. | H04L 9/0852 |
| 11,240,223 B1 * | 2/2022 | Stapleton | ................ | G06F 21/72 |

(Continued)

*Primary Examiner* — Aravind K Moorthy
(74) *Attorney, Agent, or Firm* — Foley & Lardner LLP (57) ABSTRACT

The arrangements disclosed herein relate to systems, apparatus, methods, and non-transitory computer readable media for receiving, by a server from a first device via a quantum channel, first verification information associated with a user of the first device. The server determines that the first verification information fails to verify against second verification information. In response to determining that the first verification information fails to verify against second verification information, the server stores the first verification information. In response to receiving, by the server from a second device, the first verification information and device information of the second device, the server flags the device information of the second device as a potential origin of fraud.

20 Claims, 5 Drawing Sheets

(56) References Cited

U.S. PATENT DOCUMENTS

| | | | |
|---|---|---|---|
| 11,245,519 B1* | 2/2022 | Stapleton, Jr. | H04L 9/0855 |
| 11,343,087 B1* | 5/2022 | Vakili | H04L 9/3228 |
| 11,356,247 B1* | 6/2022 | Carter, Jr. | H04L 9/0656 |
| 11,405,189 B1* | 8/2022 | Bennison | H04L 63/0807 |
| 11,575,680 B1* | 2/2023 | Challey | G06N 20/00 |
| 11,601,266 B1* | 3/2023 | Stapleton | G06F 21/72 |
| 11,663,510 B1* | 5/2023 | Carter, Jr. | B82Y 10/00 257/31 |
| 11,895,232 B1* | 2/2024 | Stapleton | H04L 9/0861 |
| 11,995,194 B1* | 5/2024 | Shea | H04L 9/0852 |
| 12,015,705 B1* | 6/2024 | Castrillo | G06F 7/58 |
| 12,113,894 B1* | 10/2024 | Huberman | H04L 63/166 |
| 12,126,713 B1* | 10/2024 | Ramanathan | H04L 9/0861 |
| 12,200,122 B1* | 1/2025 | Pala | H04L 9/3242 |
| 12,231,416 B1* | 2/2025 | Stapleton | H04L 63/08 |
| 2002/0010684 A1* | 1/2002 | Moskowitz | G06Q 20/40 713/176 |
| 2005/0060551 A1* | 3/2005 | Barchi | H04L 63/126 713/182 |
| 2006/0262930 A1* | 11/2006 | Dinu | H04L 9/0858 380/256 |
| 2009/0312090 A1* | 12/2009 | Shnowske | G07F 17/3244 463/25 |
| 2010/0290668 A1* | 11/2010 | Friedman | G06V 40/19 348/78 |
| 2010/0293614 A1* | 11/2010 | Vilppola | G06F 21/52 726/22 |
| 2011/0173676 A1* | 7/2011 | Peckover | H04L 63/08 726/3 |
| 2011/0200192 A1* | 8/2011 | Etemad | H04L 9/12 380/256 |
| 2013/0083926 A1* | 4/2013 | Hughes | H04L 9/3247 380/278 |
| 2014/0339430 A1* | 11/2014 | Hillis | G01N 22/00 250/358.1 |
| 2015/0026027 A1* | 1/2015 | Priess | G06Q 10/04 705/35 |
| 2015/0058950 A1* | 2/2015 | Miu | G06F 21/31 726/7 |
| 2015/0096002 A1* | 4/2015 | Shuart | G06F 21/32 726/7 |
| 2015/0178785 A1* | 6/2015 | Salonen | H04W 4/12 705/14.64 |
| 2015/0278293 A1* | 10/2015 | Swierk | G06F 16/22 707/766 |
| 2015/0294099 A1* | 10/2015 | Frye | G06V 40/1318 340/5.83 |
| 2015/0310444 A1* | 10/2015 | Chen | G06Q 20/308 705/44 |
| 2015/0349960 A1* | 12/2015 | Bagley | H04L 9/3228 713/168 |
| 2016/0044054 A1* | 2/2016 | Stiansen | H04L 63/1416 726/24 |
| 2016/0149901 A1* | 5/2016 | Liu | H04W 12/50 726/5 |
| 2016/0359626 A1* | 12/2016 | Fu | H04L 9/0858 |
| 2017/0054556 A1* | 2/2017 | Fu | H04L 9/0852 |
| 2017/0331623 A1* | 11/2017 | Fu | H04L 9/0852 |
| 2017/0338951 A1* | 11/2017 | Fu | H04L 9/0894 |
| 2018/0068305 A1* | 3/2018 | Baik | G06Q 20/327 |
| 2018/0069693 A1* | 3/2018 | Hong | H04L 9/0855 |
| 2018/0097840 A1* | 4/2018 | Murthy | H04L 63/02 |
| 2018/0109372 A1* | 4/2018 | Fu | H04L 9/083 |
| 2018/0109377 A1* | 4/2018 | Fu | H04L 63/0823 |
| 2018/0196694 A1* | 7/2018 | Banerjee | G06F 13/1642 |
| 2018/0213347 A1* | 7/2018 | Kumar | H04W 4/50 |
| 2018/0260569 A1* | 9/2018 | Sutton | H04L 63/18 |
| 2018/0268402 A1* | 9/2018 | Agrawal | G06Q 20/0855 |
| 2018/0270271 A1* | 9/2018 | Lee | H04L 9/0852 |
| 2019/0037396 A1* | 1/2019 | Marinovic | H04L 63/0876 |
| 2019/0123896 A1* | 4/2019 | Hong | H04L 9/0869 |
| 2019/0149327 A1* | 5/2019 | Yuan | H04L 9/0852 380/255 |
| 2019/0273607 A1* | 9/2019 | Van Der Velden | H04L 9/088 |
| 2019/0306248 A1* | 10/2019 | Swarangi | H04L 63/08 |
| 2019/0379653 A1* | 12/2019 | Mead | H04L 63/1408 |
| 2020/0110870 A1* | 4/2020 | Girdhar | G06F 21/316 |
| 2020/0364706 A1* | 11/2020 | Rose | G06Q 20/4016 |
| 2020/0374121 A1* | 11/2020 | Momchilov | H04L 9/0825 |
| 2020/0387821 A1* | 12/2020 | Griffin | G06F 21/6209 |
| 2020/0403978 A1* | 12/2020 | Allen | H04L 9/0816 |
| 2020/0412556 A1* | 12/2020 | Yoon | H04L 63/0876 |
| 2021/0006573 A1* | 1/2021 | Britt | G06F 21/31 |
| 2021/0036845 A1* | 2/2021 | Prisco | H04L 9/0855 |
| 2021/0083865 A1* | 3/2021 | Obadia | H04L 9/0852 |
| 2021/0111898 A1* | 4/2021 | McCarty | H04L 9/3213 |
| 2021/0125093 A1* | 4/2021 | Barraza Enciso | H04L 9/0852 |
| 2021/0135859 A1* | 5/2021 | Barraza Enciso | H04L 9/0869 |
| 2021/0193729 A1* | 6/2021 | Hardinger | H10F 39/805 |
| 2021/0266157 A1* | 8/2021 | Hong | H04L 9/0852 |
| 2021/0281445 A1* | 9/2021 | Trim | H04L 12/4641 |
| 2021/0297455 A1* | 9/2021 | Keith, Jr. | G06F 21/62 |
| 2021/0314350 A1* | 10/2021 | Finkelshtein | H04L 63/1466 |
| 2021/0390439 A1* | 12/2021 | Ramasamy | G06N 10/60 |
| 2022/0044240 A1* | 2/2022 | Hukmani | B82Y 10/00 |
| 2022/0101164 A1* | 3/2022 | Majumdar | G06N 10/00 |
| 2022/0108331 A1* | 4/2022 | Thomson | G06Q 40/02 |
| 2022/0182397 A1* | 6/2022 | Romero Zambrano | H04L 63/1416 |
| 2022/0191233 A1* | 6/2022 | Kras | G06F 21/6245 |
| 2022/0197985 A1* | 6/2022 | Keith, Jr. | G06V 40/70 |
| 2022/0263821 A1* | 8/2022 | Sharma | H04L 12/4641 |
| 2022/0309371 A1* | 9/2022 | Singh | G06N 10/00 |
| 2022/0345298 A1* | 10/2022 | Cap | H04L 9/0869 |
| 2022/0374784 A1* | 11/2022 | Sharma | G06N 5/01 |
| 2023/0006981 A1* | 1/2023 | Syrivelis | H04L 9/0852 |
| 2023/0014894 A1* | 1/2023 | M M | H04L 9/0852 |
| 2023/0143356 A1* | 5/2023 | Kirsanov | G06Q 20/065 705/44 |
| 2023/0230085 A1* | 7/2023 | Turgeman | G06Q 20/10 |
| 2023/0254132 A1* | 8/2023 | Ramanathan | H04L 9/0869 380/28 |
| 2023/0254331 A1* | 8/2023 | Wright | H04L 63/1416 726/22 |
| 2023/0261859 A1* | 8/2023 | Bryden | H04L 9/3215 713/168 |
| 2023/0269075 A1* | 8/2023 | Bakopoulos | H04L 9/0819 713/171 |
| 2023/0269077 A1* | 8/2023 | Syrivelis | H04L 63/205 713/171 |
| 2023/0289648 A1* | 9/2023 | Griffin | G06N 10/20 |
| 2023/0327982 A1* | 10/2023 | Rahman | H04W 36/14 370/228 |
| 2023/0328064 A1* | 10/2023 | Raman | H04L 9/0855 726/4 |
| 2023/0336334 A1* | 10/2023 | Scheible | H04L 9/0825 |
| 2023/0353348 A1* | 11/2023 | Ganguly | H04L 9/3226 |
| 2023/0370494 A1* | 11/2023 | Das | H04L 9/0869 |
| 2024/0039712 A1* | 2/2024 | Hegazy | H04L 9/0825 |
| 2024/0073010 A1* | 2/2024 | Ganguly | H04L 63/083 |
| 2024/0195834 A1* | 6/2024 | Septon | H04L 63/1475 |
| 2024/0236195 A1* | 7/2024 | Kauffman | H04L 67/02 |
| 2024/0248997 A1* | 7/2024 | Endler | G06F 21/6263 |
| 2024/0273200 A1* | 8/2024 | Solomon | G06F 21/563 |
| 2024/0281423 A1* | 8/2024 | Perrin | G06F 16/2453 |
| 2024/0291640 A1* | 8/2024 | Amer | H04L 9/0819 |
| 2024/0291727 A1* | 8/2024 | Su | A63F 13/92 |
| 2024/0305665 A1* | 9/2024 | Qi | H04L 63/1475 |
| 2024/0320531 A1* | 9/2024 | Mangla | G06N 10/20 |
| 2024/0333481 A1* | 10/2024 | Veerupakshappa | H04L 9/0852 |
| 2024/0346134 A1* | 10/2024 | Heynssens | H04L 9/0852 |
| 2024/0388434 A1* | 11/2024 | Griffin | H04L 9/0852 |
| 2024/0403450 A1* | 12/2024 | Nowak | G06F 21/6218 |
| 2024/0406181 A1* | 12/2024 | Mukherjee | H04L 41/16 |
| 2025/0003730 A1* | 1/2025 | Kwiat | G01B 9/02007 |
| 2025/0030667 A1* | 1/2025 | Cayer | H04L 9/083 |
| 2025/0038968 A1* | 1/2025 | Foo | H04L 9/40 |
| 2025/0047493 A1* | 2/2025 | Basson | H04L 9/0869 |
| 2025/0103737 A1* | 3/2025 | Shea | G06F 16/2379 |

* cited by examiner

QUANTUM-BASED INFORMATION PROTECTION

BACKGROUND

Payment fraud detection is tasked with determining the origin of a data breach. When fraud is detected on a group of users, an investigator attempts to determine a common point of purchase (e.g., a particular merchant) by all users of the group. Similarly, intrusion detection systems (IDS) are tasked with identifying the origin of an illegitimate entry into a network infrastructure. When an intrusion is detected, the point of compromise is determined, and the controls are reviewed to either determine gaps or failures. Conversely, verification methods securely convey credentials from the entry point to the verification point in an attempt to prevent payment fraud or unauthorized access to networks and resources.

SUMMARY

The arrangements disclosed herein relate to systems, apparatus, methods, and non-transitory computer readable media for receiving, by a server from a first device via a quantum channel, first verification information associated with a user of the first device. The server determines that the first verification information fails to verify against second verification information. In response to determining that the first verification information fails to verify against second verification information, the server stores the first verification information. In response to receiving, by the server from a second device, the first verification information and device information of the second device, the server flags the device information of the second device as a potential origin of fraud.

These and other features, together with the organization and manner of operation thereof, will become apparent from the following detailed description when taken in conjunction with the accompanying drawings.

DETAILED DESCRIPTION

The arrangements disclosed herein relate to systems, apparatuses, methods, and non-transitory computer-readable media for using a quantum channel and Quantum Key Distribution (QKD) to perform a password exchange. Threat detection is performed to detect and alert against eavesdropper attacker using QKD protocol. Out-of-band verification is used for identity verification, e.g., via a banking application of a user device. Utilizing a false password, the systems described herein can target and trap potential fraudulent charges.

In some arrangements, a user device transmits a password to the server via a quantum channel using QKD protocol (e.g., BB84). For example, the intended password message is sent from a user device of a customer or consumer to the server for verification services. In the scenario in which an eavesdropper device intercepts the password, both the eavesdropper device and the server (intended recipient) receives a random message, an altered version of the actual password, instead of the intended password. Accordingly, both the server and the eavesdropper device have the same false password, and the user device is unaware of the false password. In response, the server denies verification of the password, and also denies any operation (e.g., financial transaction or operation) protected the password. The server can perform an out-of-band verification with the user device. The server can notify the user device of the eavesdropping by triggering a notification (e.g., a banner notification, a pop-up window, and so on) on the banking application. On the other hand, in response to the server receiving the correct password via the quantum channel, the server can approve verification of the password and any operation protected by the password.

In addition, the server can generate a flag to protect the user of the user device. Given that the false password received by the server is same as the false password received by the eavesdropper device, the server can monitor whether the false password is used for any subsequent attempts by the eavesdropper (e.g., for a purchase). In response to determining that the false password is used, the server can identify the purchase as one made by the eavesdropper, flag the purchase as fraudulent, notify the merchant and relevant authorities, and collect information about the eavesdropper device that is used for the fraudulent transaction. Given that the eavesdropper is unaware that it has a false password, the eavesdropper may continue to commit fraud with the false password under the assumption the eavesdropper's attack was successful.

Figure 1A:
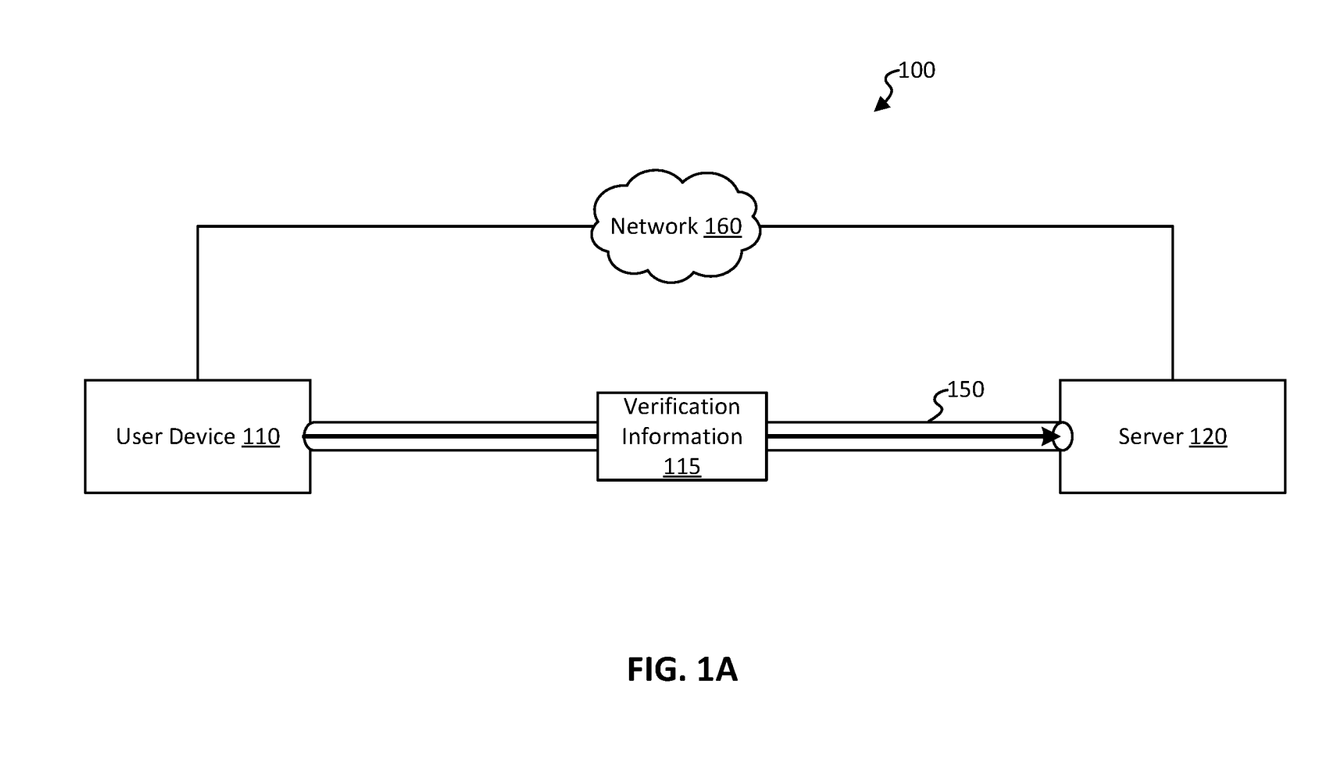
FIGS. 1A and 1B are schematic block diagrams illustrating an example system for implementing quantum-based information protection, according to various arrangements.
Figure 1B:
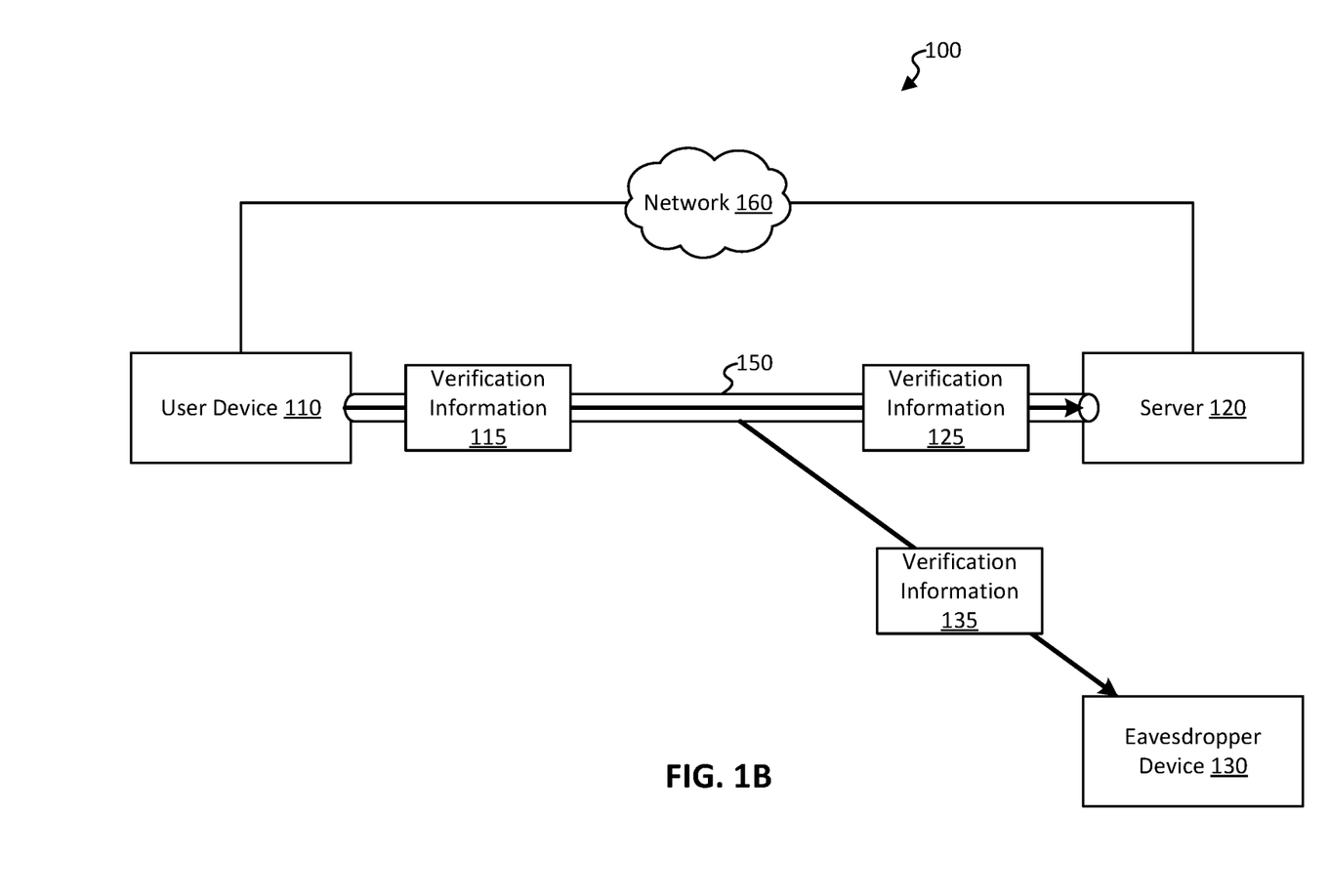

FIGS. 1A and 1B are schematic block diagrams illustrating an example system 100 for implementing quantum-based information protection, according to various arrangements. The system 100 includes a user device 110 and the server 120. The user device 110 is connected to the server 120 via a quantum channel 150. The user device 110 can send information, such as verification information 115 (e.g., username, password, biometric information, and so on), to the server 120 via the quantum channel 150. While verification information 115 is used throughout this disclosure as an example of information sent by the user device 110 to the server 120, other types of sensitive information such as name, address, phone number, email address, payment information, payment number, Personal Identification Number (PIN), Personally Identifiable Information (PII), social security number, documents, and so on.

The quantum channel 150 refers to a channel by which the verification information 115 (e.g., quantum information) can be transferred or transmitted using quantum bits or qubits. For example, the user device 110 can generate the verification information 115 as a stream of quantum particles such as photons containing information such as a string of binary zeroes and ones. The quantum particles can be entangled or regular photons.

The user device 110 and the server 120 can communicate over a network 160. The network 160 is any suitable Local Area Network (LAN), Wide Area Network (WAN), or a combination thereof. For example, the network 160 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The network 160 is structured to permit the exchange of data, values, instructions, messages, and the like.

FIG. 1A illustrates a scenario in which the user device 110 transmits the verification information 115 via the quantum channel 150 without any eavesdropping party attempting to intercept or otherwise obtain the verification information 115. On the other hand, FIG. 1B illustrates a scenario in which the eavesdropper device 130 attempts to intercept or obtain the verification information 115. The eavesdropper device 130 reading the quantum entangled particles corresponding to the verification information 115 before the server 120 reading those quantum entangled participles destroys the entanglement. That is, although the server 120 can still read some information (e.g., the verification information 125), the quantum particles corresponding to the verification information 115 are affected by the reading of the quantum particles corresponding to the verification information 115 by the eavesdropper device 130. Thus, if an attempt is made by the eavesdropper device 130 (e.g., an attacker or an eavesdropper) to read the stream corresponding to the verification information 115 within the quantum channel 150, the affected particles become no longer entangled, resulting in a different interpretation.

Accordingly, the server 120 reads the quantum particles corresponding to the verification information 125, and the eavesdropper device 130 reads the quantum particles corresponding to the verification information 135. In some arrangements, the interpretation of the quantum particles corresponding to the verification information 125 is the same as the interpretation of the quantum particles corresponding to the verification information 135. That is, by the eavesdropper device 130 intercepting the quantum particles corresponding to the verification information 115, both the server 120 and the eavesdropper device 130 cannot interpret the received quantum particles as the verification information 115, but rather as different verification information 125 and 135, respectively, where the verification information 125 and 135 are the same. The quantum particles corresponding to the verification information 125 and 135 may appear to be random, invalid, cannot be interpreted, or false. Specifically, both the verification information 125 and 135 are the same false password based on which the server 120 denies verification of the user device 110 or a user of the user device 110. The server 120 can request the user device 110 to provide additional verification information or another form of verification over the network 160, referred to as out-of-band verification.

The server 120 can also store the verification information 125 (which is the same as the verification information 135) in a database such that when the server 120 receives the same verification information 125, the server 120 can store associated device information that identifies one or more of the device providing the verification information 125 such as the device identifier (e.g., an International Mobile Equipment Identity (IMEI)), a merchant identifier, a merchant device identifier (e.g., a Point-Of-Sale (POS) identifier), an equipment identifier (e.g., of an Autonomous Teller Machine (ATM) identifier), a network address, a location (e.g., a Global Positioning System (GPS)), and so on that is received along with the verification information 125. The server 120 can receive the verification information 125 from another quantum channel or over another convention network such as the network 160.

Figure 2A:
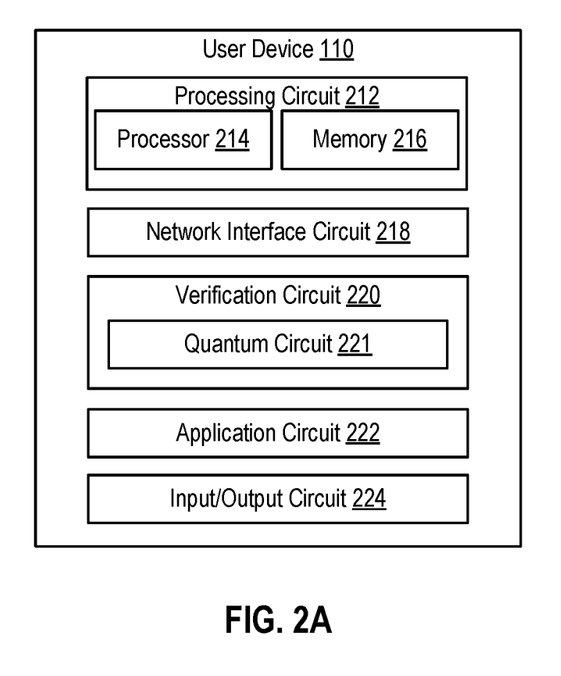
FIG. 2A is a block diagram of an example of the server of the system set forth in FIGS. 1A and 1B, according to some arrangements.

FIG. 2A is a block diagram of an example of the user device 110 of the system 100 set forth in FIGS. 1A and 1B, according to some arrangements. Referring to FIGS. 1-2A, the user device 110 is shown to include various circuits and logic for implementing the operations described herein. More particularly, the user device 110 includes one or more of a processing circuit 212, a network interface circuit 218, an verification circuit 220, an application circuit 222, and an input/output circuit 224. While various circuits, interfaces, and logic with particular functionality are shown, it should be understood that the user device 110 includes any number of circuits, interfaces, and logic for facilitating the operations described herein. For example, the activities of multiple circuits are combined as a single circuit and implemented on a same processing circuit (e.g., the processing circuit 212), as additional circuits with additional functionality are included.

In some arrangements, the processing circuit 212 includes a processor 214 and a memory 216. The processor 214 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 216 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 216 is or includes tangible, non-transient volatile memory or non-volatile memory. Accordingly, the memory 216 includes database components, object code components, script components, or any other type of information structure for supporting the various activities and information structures described herein. The processing circuit 212 can be used to implemented one or more of the circuits 218, 220, 222, and 224.

The network interface circuit 218 is configured for and structured to establish a connection and communicate with the server 120 via the network 160 or another suitable wired, wireless, or physical connection. The network interface circuit 218 is structured for sending and receiving data over a communication network (e.g., the network 160). Accordingly, the network interface circuit 218 includes any of a cellular transceiver (for cellular standards), wireless network transceiver (for 802.11X, ZigBee, Bluetooth, Wi-Fi, or the like), wired network interface, or a combination thereof. For example, the network interface circuit 218 may include wireless or wired network modems, ports, baseband processors, and associated software and firmware.

The application circuit 222 can be used to execute one or more applications or software on the user device 110 for which verification information needs to be send to the server 120, before the server 120 can provide information or data to the application executed on the user device 110. For example, the application circuit 222 can execute one or more applications that generate data to be accessed by the server 120 or that receive data from the server 120. For example, the application circuit 222 can execute a mobile banking application, a browser, a word processing application, a mobile banking application, a mobile wallet, and so on.

The input/output circuit 224 is configured to receive user input from and provide information to the user. In this regard, the input/output circuit 224 is structured to exchange data, communications, instructions, etc. with an input/output component of the user device 110. For example, the input/output circuit 224 can include an input device for receiving the verification information from the user operating the user device 110. Accordingly, in some arrangements, the input/output circuit 224 includes an input/output device such as a display device, touchscreen, keyboard, microphone, biometric sensor, and/or the like. In arrangements in which the user device 110 is a POS device or an ATM, the input/output circuit 205 can include one or more of a payment card reader, a barcode reader, a Bluetooth device, a Near Field Communication (NFC) reader, and the like for receiving information from a customer. In some arrangements, the input/output circuit 205 includes communication circuitry for facilitating the exchange of data, values, messages, and the like between the input/output device and the components of the user device 110. In some arrangements, the input/output circuit 205 includes machine-readable media for facilitating the exchange of information between the input/output device and the components of the user device 110. In still another arrangement, the input/output circuit 205 includes any combination of hardware components (e.g., a touchscreen), communication circuitry, and machine-readable media.

The verification circuit 220 is executed by the processing circuit 212 in some arrangements. The verification circuit 220 can generate at least one of quantum bits, qubits, or quantum particles as a string corresponding to the verification information 115 and send the same to the server 120 via the quantum channel 150. For example, the verification circuit 220 includes a quantum circuit 221. The quantum circuit 221 can generate a stream of quantum particles, such as photons containing information such as a string of binary zeroes and ones of the verification information 115. Although shown to reside in the user device 110, the quantum circuit 211 can also be located on a third-party system.

Figure 2B:
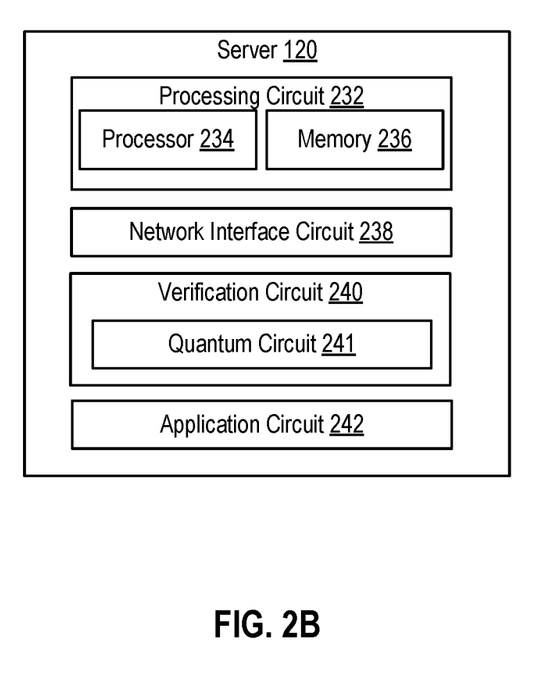
FIG. 2B is a block diagram of an example of the server of the system set forth in FIGS. 1A and 1B, according to some arrangements.

For example, the quantum circuit 221 can generate and send the stream of quantum particles according to the QKD protocol (e.g., BB84, E91, and so on). For example, the intended password message is sent from the user device 110 of to the server 120. In some examples, the quantum circuit 221 can include a FIG. 2B is a block diagram of an example of the server 120 of the system 100 set forth in FIGS. 1A and 1B, according to some arrangements. Referring to FIGS. 1-2B, the server 120 is shown to include various circuits and logic for implementing the operations described herein. More particularly, the server 120 includes one or more of a processing circuit 232, a network interface circuit 238, a cryptography circuit 240, and an application circuit 242. While various circuits, interfaces, and logic with particular functionality are shown, it should be understood that the server 120 includes any number of circuits, interfaces, and logic for facilitating the operations described herein. For example, the activities of multiple circuits are combined as a single circuit and implemented on a same processing circuit (e.g., the processing circuit 232), as additional circuits with additional functionality are included.

In some arrangements, the processing circuit 232 has a processor 234 and memory 236. The processor 234 is a processing component such as the processor 214. The memory 236 is a memory device such as the memory 216. The processing circuit 232 can be used to implemented one or more of the circuits 238, 240, and 242.

The network interface circuit 238 is a network device such as the network interface circuit 218. The network interface circuit 238 is configured for and structured to establish a connection and communicate with the user device 110 via the network 160.

The verification circuit 240 can be implemented with the processing circuit 232 or a separate processing circuit similar to the processing circuit 232. The verification circuit 240 can receive at least one of quantum bits, qubits, or quantum particles as a string corresponding to the verification information 115 or 125 via the quantum channel 150 and interpret the same to determine the received verification information. For example, the verification circuit 240 includes a quantum circuit 241. The quantum circuit 241 can receive a stream of quantum particles, such as photons containing information such as a string of binary zeroes and ones of the verification information 115 or 125. The quantum circuit 241 can interpret the quantum mechanics properties of the received stream of quantum particles for interpretation. Although shown to reside in the server 120, the quantum circuit 241 can also be located on a third-party system.

The application circuit 242 can be used to execute one or more applications or software on the server 120 for which verification of the user device 110 is needed to send data or information to the user device 110 or receive from the user device 110 (for the application executed by the application circuit 222). For example, the application circuit 242 can execute one or more applications that use verified the verification information 115 or 125 as input to generate an output or a decision. For example, the application circuit 242 can execute a server application for a mobile banking platform, a browser, a word processing application, a mobile banking platform, a mobile wallet platform, and so on.

Figure 3:
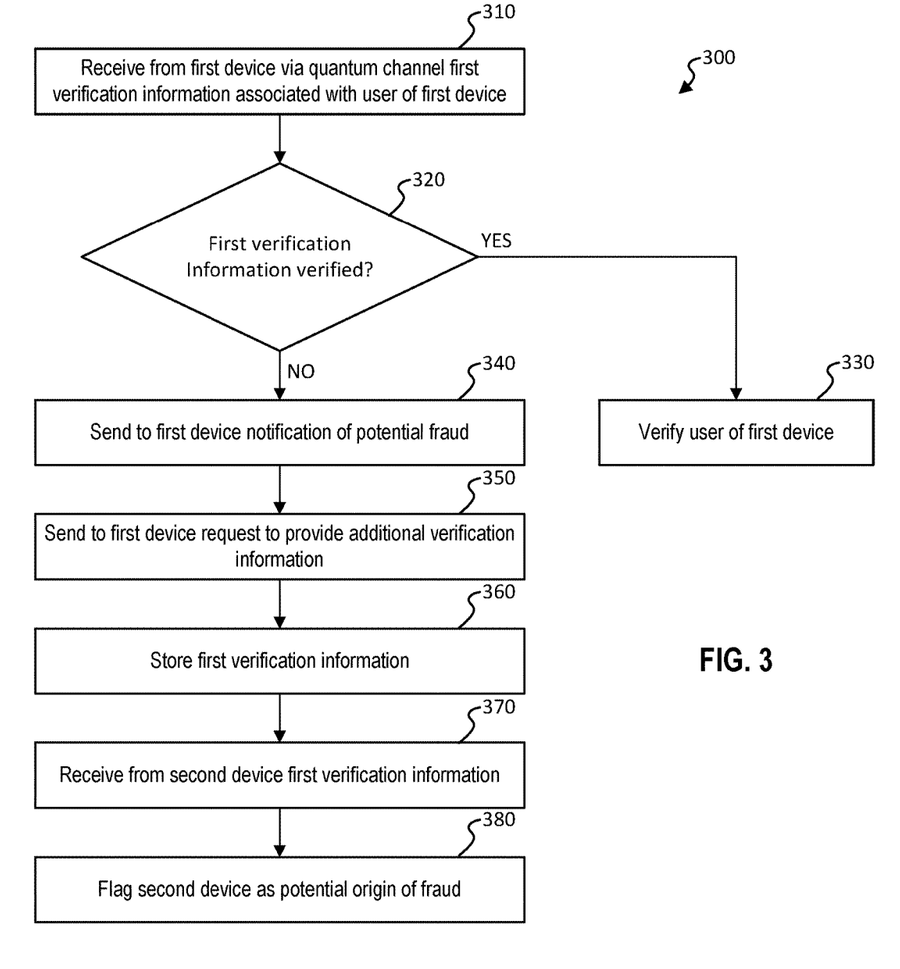
FIG. 3 is a flowchart diagram illustrating an example method for quantum-based information detection, according to various arrangements.

FIG. 3 is a flowchart diagram illustrating an example method 300 for quantum-based information protection, according to various arrangements. The method 300 can be performed by the server 120, in some arrangements.

At 310, the server 120 (e.g., the quantum circuit 241) receives from a first device (e.g., the user device 110) via the quantum channel 150 first verification information associated with the user of the first device. In some arrangements, receiving the first verification information includes receiving, by the quantum circuit 241 from the first device via the quantum channel 150, at least one of quantum bits, qubits, photons, or quantum particles. The quantum circuit 241 interprets the at least one of quantum bits, qubits, photons, or quantum particles as a string corresponding to the first verification information, to extract the first verification information. The first verification information can be the verification information 115 in the examples in which there is no interception attempt and can be the verification information 125 in the example in which there is an interception attempt.

At 320, the server 120 (e.g., the verification circuit 240) determines whether the first verification information can be verified, for example, against second verification information. In some examples, 320 includes verifying whether the first verification information matches a second verification information. The second verification information refers to the correct verification information that is stored in a database of the server 120 or another database coupled to the server. In some examples, the first verification information includes a hash of a password, which is compared to the stored second verification information (e.g., the stored hash of the password). In some examples, the first verification information includes PIN Verification Value (PVV), which is compared to the stored second verification information (e.g., a stored PVV). The PVV is generated by encrypting a PIN using a PIN Verification Key (PVK). In some examples, the first verification information includes a biometric sample, which is compared to the second verification information (e.g., the stored biometric template). In some examples, the first verification information includes a challenge value is signed by the user device 110 (e.g., the verification circuit 220) using a private key of the user device 110 and verified by the server 120 using a public key of the user device 110.

In response to determining that the first verification information (e.g., the verification information 115) is verified (320: YES), the server 120 (e.g., the verification circuit 240) verifies the user of the first device, at 330. This is the scenario shown in FIG. 1A, where no eavesdropper or attacker has intercepted the verification information 115.

On the other hand, in response to determining that the first verification information (e.g., the verification information 125) is not verified (320: NO), the server 120 (e.g., the verification circuit 240) performs at least one of 340, 350, and 360 in any suitable order or simultaneously. This is the scenario shown in FIG. 1B, where an eavesdropper or attacker has attempted to intercept the verification information 115.

For example, at 340, the server 120 sends to the first device (e.g., the user device 110) a notification of potential fraud, notifying the first device that there may be an eavesdropper or attacker attempting to intercept the verification information 115. The notification, when received at the first device, can trigger a forced display (e.g., a pop-up notification) displayed by an output device of the input/output circuit 224. In some examples, the server 120 (e.g., the network interface circuit 238) can send the notification to the user device 110 via the network 160 different from the quantum channel 150.

At 350, the server 120 sends to the first device a request to provide additional verification information. In some examples, the server 120 (e.g., the network interface circuit 238) can send the request to the user device 110 via the network 160. In response, the server 120 can receive the additional verification information from the first device via the network 160 different from the quantum channel 150.

At 360, the server 120 (e.g., the verification circuit 240) stores the first verification information (e.g., the verification information 125) in a database on the server 120 or another suitable database, such as a database of known false passwords.

At 370, the server 120 receives from a second device, the first verification information 125 or 135 and device information of the second device. The second device can be the eavesdropper device 130 or another suitable device (e.g., a POS, an ATM, a smartphone, and so on) where the first verification information 125 or 135 is initially received via manual input or a network, before being sent to the server 120. The device information refers to metadata or associated data that is typically received by the server 120 from the second device in this type of transactions, such as the device identifier (e.g., an IMEI), a merchant identifier, a merchant device identifier (e.g., a POS identifier), an equipment identifier (e.g., of an ATM identifier), a network address, a location (e.g., a GPS), and so on that is received along with the verification information 125.

In response, at 380, the server 120 (e.g., the verification circuit 240) flags this transaction attempt, including the second device information, as a potential origin of fraud. For example, the server 120 (e.g., verification circuit 240) can store the second device information in a database of known potential origins of fraud, where such database can be maintained by the server 120 or another suitable third-party device.

Figure 4:
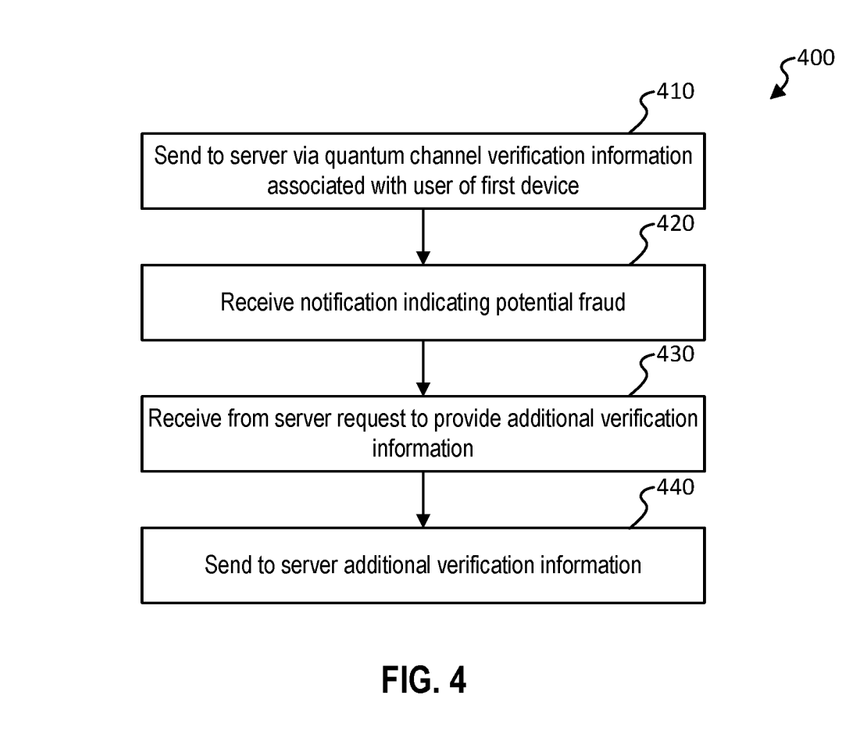
FIG. 4 is a flowchart diagram illustrating an example method for quantum-based information protection, according to various arrangements.

FIG. 4 is a flowchart diagram illustrating an example method 400 for quantum-based information protection, according to various arrangements. The method 400 can be performed by the user device 110, referred to as the first device, in some arrangements.

At 410, the first device (e.g., the quantum circuit 221) sends to the server 120 via a quantum channel 150 verification information 115 associated with a user of the first device. The server 120 receives first verification information (e.g., 115 or 125, depending on whether there has been an attempt to intercept the verification information 115) corresponding to the verification information 115 sent by the first device. The server 120 may determine that the first verification information (e.g., 125) fails to verify against second verification information (e.g., 320: NO).

In some arrangements, sending the verification information 115 includes generating, by the first device (e.g., the quantum circuit 221), at least one of quantum bits, qubits, photons, or quantum particles based on a string corresponding to the verification information 115. The Quantum circuit 221 sends the least one of quantum bits, qubits, photons, or quantum particles via the quantum channel 150 to the server 120.

In response, the first device can perform at least one of 420 or 430 in any suitable order or simultaneously. At 420, the first device (e.g., the network interface circuit 218) receives from the server 160 via the network 160 different from the quantum channel 150a notification of potential fraud, notifying the first device that there may be an eavesdropper or attacker attempting to intercept the verification information 115. The notification, when received at the first device, can trigger a forced display (e.g., a pop-up notification) displayed by an output device of the input/output circuit 224.

At 430, the first device receives from the server 120 a request to provide additional verification information. In some examples, the first device (e.g., the network interface circuit 218) can receive the request from the server 120 via the network 160. In response, at 440, the first device (e.g., the network interface circuit 218) can send the additional verification information to the server 120 via the network 160 different from the quantum channel 150.

As noted above, in both the methods 300 and 400, the eavesdropper device 130 measures the verification information 115 transmitted by the first device before the verification information is received by the server 120, altering the quantum mechanics properties of at least one of quantum bits, qubits, photons, or quantum particles corresponding to the verification information 115 transmitted by the first device. As a response to the eavesdropper device 130 measuring verification information transmitted by the first device, the first verification information 125 received by the server 120 and third verification information 135 received by the eavesdropper device 130 are same. This allows the server 120 to record the false verification information 125/135 (e.g., at 360) and monitor its future use (e.g., at 370 and 380) to identify an origin of fraud.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   receiving, by a server from a first device via a quantum channel, first verification information associated with a user of the first device;
   determining, by the server, that the first verification information fails to verify against second verification information;
   in response to determining that the first verification information fails to verify, storing, by the server, the first verification information;
   in response to receiving, by the server from a second device, the first verification information and device information of the second device, flagging, by the server, the device information of the second device as a potential origin of fraud.

2. The method of claim 1, further comprising sending, by the server to the first device in response to determining that the first verification information fails to verify, a request to provide additional verification information, wherein at least one of:
   the request is sent by the server to the first device via a network different from the quantum channel; or
   the additional verification information is received by the server from the first device via the network different from the quantum channel.

3. The method of claim 1, further comprising sending, by the server to the first device in response to determining that the first verification information fails to match the second verification information, a notification indicating potential fraud via a network different from the quantum channel.

4. The method of claim 1, further comprising:
   determining, by the server, that the first verification information is verified;
   in response to determining that the first verification information is verified, verifying, by the server, the user of the first device.

5. The method of claim 1, wherein receiving the first verification information comprises:
   receiving, by the server from the first device via the quantum channel, at least one of quantum bits, qubits, photons, or quantum particles; and
   interpreting, by the server, the at least one of the quantum bits, qubits, photons, or quantum particles as a string corresponding to the first verification information.

6. The method of claim 1, wherein the verification information comprises at least one of a name, address, phone number, email address, payment information, payment number, Personal Identification Number (PIN), Personally Identifiable Information (PII), social security number, documents a username, a password, or biometric information.

7. The method of claim 1, wherein
   an eavesdropper device measures verification information transmitted by the first device before the verification information is received by the server, altering the quantum mechanics properties of at least one of quantum bits, qubits, photons, or quantum particles corresponding to the verification information transmitted by the first device; and
   in response to the eavesdropper device measuring verification information transmitted by the first device, the first verification information received by the server and third verification information received by the eavesdropper device are same.

8. A method, comprising:
   sending, by a first device to a server via a quantum channel, verification information associated with a user of the first device, wherein the server receives first verification information corresponding to the verification information sent by the first device, the server determines that the first verification information fails to verify against second verification information, and in response to determining that the first verification information fails to verify, the server stores the first verification information, and wherein in response to receiving from a second device the first verification information and device information of the second device, the server flags the device information of the second device as a potential origin of fraud;
   receiving, by the first device from the server, a request to provide additional verification information; and
   in response to receiving the request to provide the additional verification information, sending, by the first device to the server via a network different from the quantum channel, the additional verification information.

9. The method of claim 8, further comprising receiving, by the first device from the server from a network different from the quantum channel, a notification indicating potential fraud.

10. The method of claim 8, wherein the request is received from a network different from the quantum channel.

11. The method of claim 8, wherein sending the verification comprises:
    generating, by the first device, at least one of quantum bits, qubits, photons, or quantum particles based on a string corresponding to the verification information; and sending, by the first device, the at least one of quantum bits, qubits, photons, or quantum particles via the quantum channel to the server.

12. The method of claim 8, wherein the verification information comprises at least one of a name, address, phone number, email address, payment information, payment number, Personal Identification Number (PIN), Personally Identifiable Information (PII), social security number, documents a username, a password, or biometric information.

13. The method of claim 8, wherein
an eavesdropper device measures the verification information transmitted by the first device before the verification information is received by the server, altering the quantum mechanics properties of at least one of quantum bits, qubits, photons, or quantum particles corresponding to the verification information transmitted by the first device; and
in response to the eavesdropper device measuring verification information transmitted by the first device, the first verification information received by the server and third verification information received by the eavesdropper device are same.

14. A system, comprising:
at least one processing circuit each comprising at least one processor and at least one memory, wherein the at least one processor is configured to:
receive, from a first device via a quantum channel, first verification information associated with a user of the first device;
determine that the first verification information fails to verify against second verification information;
in response to determining that the first verification information fails to verify, store the first verification information;
in response to receiving, from a second device, the first verification information and device information of the second device, flagging the device information of the second device as a potential origin of fraud.

15. The system of claim 14, the at least one processor is further configured to send to the first device in response to determining that the first verification information fails to verify, a request to provide additional verification information, wherein at least one of:
the request is sent by the server to the first device via a network different from the quantum channel; or
the additional verification information is received by the server from the first device via the network different from the quantum channel.

16. The system of claim 14, the at least one processor is further configured to send to the first device in response to determining that the first verification information fails to verify, a notification indicating potential fraud via a network different from the quantum channel.

17. The system of claim 14, the at least one processor is further configured to:
determine that the first verification information is verified;
in response to determining that the first verification information is verified, verify the user of the first device.

18. The system of claim 14, wherein receiving the first verification information comprises:
receiving, from the first device via the quantum channel, at least one of quantum bits, qubits, photons, or quantum particles; and
interpreting the at least one of the quantum bits, qubits, photons, or quantum particles as a string corresponding to the first verification information.

19. The system of claim 14, wherein the verification information comprises at least one of a name, address, phone number, email address, payment information, payment number, Personal Identification Number (PIN), Personally Identifiable Information (PII), social security number, documents a username, a password, or biometric information.

20. The system of claim 14, wherein
an eavesdropper device measures verification information transmitted by the first device before the verification information is received by the server, altering the quantum mechanics properties of at least one of quantum bits, qubits, photons, or quantum particles corresponding to the verification information transmitted by the first device; and
in response to the eavesdropper device measuring verification information transmitted by the first device, the first verification information received by the server and third verification information received by the eavesdropper device are same.

* * * * *